United States Patent
Lester et al.

(10) Patent No.: US 12,416,519 B2
(45) Date of Patent: Sep. 16, 2025

(54) MEASURING CUP HAVING A BITMAPPED PATTERN

(71) Applicant: The Procter & Gamble Company, Cincinnati, OH (US)

(72) Inventors: Joseph Craig Lester, Liberty Township, OH (US); Joseph Henry Nurre, West Chester, OH (US); Marc Andrew Mamak, Mason, OH (US); Adam James Viel, Guilford, IN (US); Victoria Anne Borchert, West Chester, OH (US); Anthony Ogg, West Chester, OH (US); William Raymond Myers, Cincinnati, OH (US); Gregory Scot Miracle, Liberty Township, OH (US); Philip Andrew Sawin, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 127 days.

(21) Appl. No.: 18/127,976

(22) Filed: Mar. 29, 2023

(65) Prior Publication Data
US 2024/0328845 A1     Oct. 3, 2024

(51) Int. Cl.
*G01F 19/00* (2006.01)

(52) U.S. Cl.
CPC .................... *G01F 19/00* (2013.01)

(58) Field of Classification Search
CPC ....................................... G01F 19/00
See application file for complete search history.

(56) References Cited

U.S. PATENT DOCUMENTS

| | | | |
|---|---|---|---|
| 3,490,290 A * | 1/1970 | Bilson | G01F 19/00 141/345 |
| 4,990,792 A | 2/1991 | Frei | |
| 5,123,574 A * | 6/1992 | Poulos | B65D 83/0409 222/362 |
| 5,429,908 A | 7/1995 | Hokuf | |
| 6,118,096 A | 9/2000 | Feng et al. | |
| 6,423,399 B1 | 7/2002 | Endo | |
| 6,681,055 B1 | 1/2004 | Sato | |
| 7,009,633 B2 | 3/2006 | Steenackers | |

(Continued)

FOREIGN PATENT DOCUMENTS

| | | |
|---|---|---|
| CN | 101564947 B | 12/2010 |
| CN | 106674948 A | 5/2017 |

(Continued)

OTHER PUBLICATIONS

All Office Actions; U.S. Appl. No. 18/618,205, filed Mar. 27, 2024.

(Continued)

*Primary Examiner* — Jamel E Williams
(74) *Attorney, Agent, or Firm* — Gary J. Foose

(57) ABSTRACT

A measuring cup including a bottom end and an open end opposite the bottom end; a sidewall extending from said bottom end to the open end, wherein the sidewall has an exterior surface; and a dosing indicium integral with the exterior surface, wherein at least a portion of the dosing indicium includes a bitmapped pattern of chemically or structurally modified bits of the sidewall, wherein the bitmapped pattern includes at least two rows of bits.

26 Claims, 8 Drawing Sheets

(56) References Cited

U.S. PATENT DOCUMENTS

| | | |
|---|---|---|
| 7,394,479 B2 | 7/2008 | Assa |
| 7,649,154 B2 | 1/2010 | Ripperger et al. |
| 8,663,754 B2 | 3/2014 | Liu et al. |
| 9,168,696 B2 | 10/2015 | Farrell |
| 9,269,035 B2 | 2/2016 | Redd |
| 9,636,776 B2 | 5/2017 | Dallarosa et al. |
| 9,764,563 B2 | 9/2017 | Song et al. |
| 10,365,499 B2 | 7/2019 | Schaur et al. |
| 10,377,145 B2 | 8/2019 | Song et al. |
| 10,942,055 B1* | 3/2021 | Zhong .................... G01F 11/24 |
| 2004/0247829 A1 | 12/2004 | Depres |
| 2005/0218126 A1* | 10/2005 | Leyvraz ................. B41M 5/262 |
| | | 219/121.69 |
| 2006/0197826 A1 | 9/2006 | Assa et al. |
| 2010/0209698 A1 | 8/2010 | Kornherr |
| 2011/0198837 A1 | 8/2011 | Parrinello |
| 2012/0324997 A1 | 12/2012 | Tharp |
| 2014/0206030 A1* | 7/2014 | Gelfand ................ G09F 3/0297 |
| | | 422/547 |
| 2014/0305831 A1 | 10/2014 | Hansen |
| 2016/0256955 A1 | 9/2016 | Andrei et al. |
| 2016/0263701 A1 | 9/2016 | Li et al. |
| 2018/0350271 A1 | 12/2018 | Schmitt |
| 2019/0056322 A1 | 2/2019 | Schulz et al. |
| 2019/0112091 A1 | 4/2019 | Neufarth et al. |
| 2019/0138867 A1 | 5/2019 | Vander Aa |
| 2019/0193445 A1 | 6/2019 | Harrison et al. |
| 2021/0334056 A1 | 10/2021 | Gabato et al. |
| 2022/0097414 A1* | 3/2022 | Hirayama ............... B65B 61/26 |
| 2022/0281254 A1 | 9/2022 | Kokkelenberg |
| 2022/0410608 A1 | 12/2022 | Hirayama et al. |
| 2023/0121684 A1 | 4/2023 | Lester et al. |
| 2023/0211624 A1 | 7/2023 | Sato |
| 2024/0326157 A1 | 10/2024 | Sawin |
| 2024/0326171 A1 | 10/2024 | Lester |
| 2024/0326500 A1 | 10/2024 | Neumann |
| 2024/0326502 A1 | 10/2024 | Neumann |
| 2024/0328844 A1* | 10/2024 | Lester .................... B65D 51/24 |
| 2024/0391019 A1 | 11/2024 | Lester |
| 2025/0083464 A1 | 3/2025 | Neumann et al. |

FOREIGN PATENT DOCUMENTS

| | | |
|---|---|---|
| CN | 107672335 A | 2/2018 |
| EP | 0327508 A2 | 8/1989 |
| EP | 1939002 A2 | 7/2008 |
| EP | 2184738 A1 | 5/2010 |
| EP | 3088200 A1 | 11/2016 |
| EP | 3711966 A1 | 9/2020 |
| GB | 2421221 A | 6/2006 |
| JP | S63295080 A | 12/1988 |
| JP | 3705081 B2 | 12/2001 |
| JP | 2002144055 A | 5/2002 |
| JP | 2002283073 A | 10/2002 |
| JP | 2005066653 A | 3/2005 |
| JP | 2006255718 A | 9/2006 |
| JP | 3141949 U | 5/2008 |
| JP | 2015100808 A | 6/2015 |
| JP | 6220587 B2 | 10/2017 |
| JP | 2018192800 A | 12/2018 |
| JP | 2019026285 A * | 2/2019 |
| JP | 2019034752 A | 3/2019 |
| JP | 2020152435 A | 9/2020 |
| WO | 9412352 A1 | 6/1994 |
| WO | 0035678 A1 | 6/2000 |
| WO | 2010011227 A1 | 1/2010 |
| WO | 2012145306 A2 | 10/2012 |
| WO | 2012150926 A1 | 11/2012 |
| WO | 2013183000 A1 | 12/2013 |
| WO | 2015082869 A1 | 6/2015 |
| WO | 2016162753 A1 | 10/2016 |
| WO | 2017198986 A1 | 11/2017 |
| WO | 2021219850 A1 | 11/2021 |
| WO | 2023064739 A1 | 4/2023 |
| WO | 2023064740 A1 | 4/2023 |

OTHER PUBLICATIONS

Unpublished U.S. Appl. No. 18/618,205, filed Mar. 27, 2024, to Joseph Craig Lester et. al.
PCT Search Report and Written Opinion for PCT/US2024/022116 dated Jul. 29, 2024, 13 pages.
All Office Actions; U.S. Appl. No. 17/987,893, filed Nov. 16, 2022.
All Office Actions; U.S. Appl. No. 17/987,895, filed Nov. 16, 2022.
All Office Actions; U.S. Appl. No. 17/963,215, filed Oct. 11, 2022.
All Office Actions; U.S. Appl. No. 18/127,965, filed Mar. 29, 2023.
All Office Actions; U.S. Appl. No. 18/128,359, filed Mar. 30, 2023.
Unpublished U.S. Appl. No. 17/987,893, filed Nov. 16, 2022, to Joseph Craig Lester et. al.
Unpublished U.S. Appl. No. 17/987,895, filed Nov. 16, 2022, to Joseph Craig Lester et. al.
Unpublished U.S. Appl. No. 18/127,965, filed Mar. 29, 2023, to Joseph Craig Lester et. al.
Unpublished U.S. Appl. No. 18/128,359, filed Mar. 30, 2023, to Joseph Craig Lester et. al.

* cited by examiner

MEASURING CUP HAVING A BITMAPPED PATTERN

FIELD OF THE INVENTION

Laser marked measuring cup having a bitmapped pattern.

BACKGROUND OF THE INVENTION

Many liquid and particulate products provide measuring cup that the user can employ to measure the amount of product to be used for a task. For products such as dish detergents, laundry detergents, particulate laundry scent additives, fabric softeners, beverage concentrates, shampoo, hair conditioner, medicinal products, mouthwash, and the like, the measuring cup is attached to the container. The measuring cup may be attached to the container, attached to the closure of the container, or may function as the closure for the container.

Measuring cups for household products are typically fabricated from plastic. Plastic measuring cups can be formed by injection molding, blow molding, injection blow molding, casting, or other suitable process for making plastic parts.

Historically, measure marks on plastic measuring cups have been provided by printing the measure marks on the measuring cup, providing the measure marks on an in-mold label applied to the measuring cup, or molding the measure marks into the shape of the measuring cup as raised portions or depressed portions relative to surrounding or adjacent material. Printing measure marks on plastic measuring cups is a slow process and printing on curved shapes can be technically challenging. Furthermore, printed marks are subject to wear and tear which may deteriorate the measure marks during use, especially if the measuring cup is placed into the washing machine along with the textiles being washed. In mold labels require specialized equipment to handle the label and the finished measuring cup is relatively expensive to produce compared to measuring cups produced in another manner. Molding the marks into the shape of the measuring cup requires specially shaped molds and making changes the measure marks, as might be required when the formulation of the product is changed, requires new molds, which are expensive. Molded measure marks may be challenging for the user to perceive in certain poorly lit environments.

With the above limitations in mind, there is a continuing unaddressed need for measuring cups that can be produced at high speed, are inexpensive to produce, have durable measure marks, have readily perceivable marks, and can be changed easily and inexpensively.

SUMMARY OF THE INVENTION

A measuring cup comprising: a bottom end and an open end opposite said bottom end; a light pervious sidewall extending from said bottom end to said open end, wherein said sidewall has an exterior surface; and a dosing indicium integral with said exterior surface, wherein at least a portion of said dosing indicium comprises a bitmapped pattern of chemically or structurally modified bits of said sidewall, wherein said bitmapped pattern comprises at least two rows of bits.

DETAILED DESCRIPTION OF THE INVENTION

Figure 1:
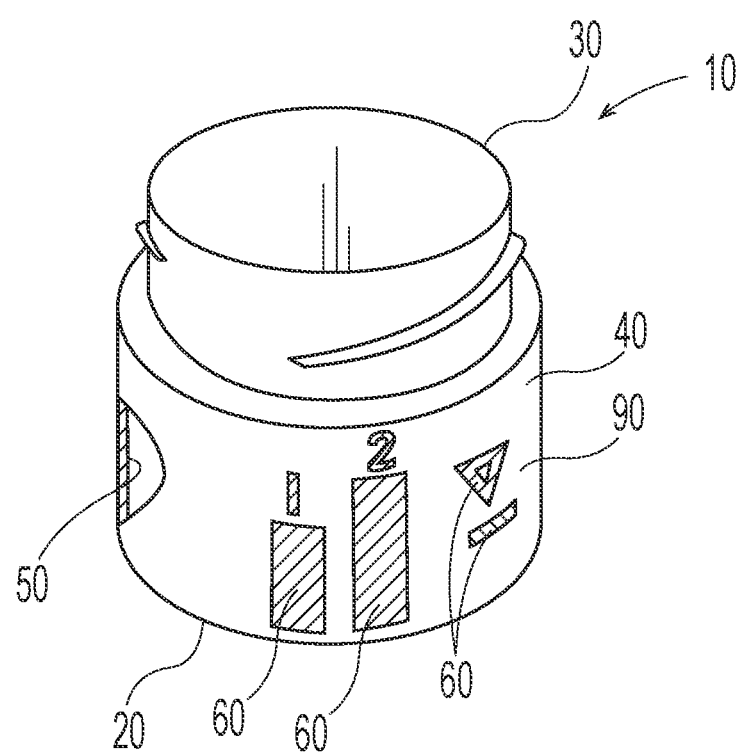
FIG. 1 is a measuring cup.

A measuring cup 10 is shown in FIG. 1. The measuring cup comprises a bottom end 20 and an open end 30 opposite the bottom end 20. The measuring cup 10 comprises a sidewall 40 extending from the bottom end 20 to the open end 30. The sidewall 40 has an exterior surface 90. The sidewall 40 has an interior surface 50, opposite the exterior surface 90. The measuring cup 10 comprises a dosing indicium 60 integral with the exterior surface 90. At least a portion of the dosing indicium 60 comprises a bitmapped pattern of chemically or structurally modified bits of the sidewall 40. The bitmapped pattern comprises at least two rows of bits. The exterior surface 90 can be curved coincident with at least a portion of the dosing indicium 60.

A dosing indicium 60 is a marked portion of the sidewall 40 associated with a partial volume of the measuring cup 10 as measured orthogonal to a resting plane of the measuring cup. The measuring cup 10 can comprise more than one dosing indicium 60. The measuring cup 10 can comprise at least two dosing indicia 60. One of the dosing indicia 60 can be positioned to indicate a first volume or quantity of liquid and another dosing indicium can be positioned to indicate a second volume or quantity of liquid that differs from said first volume or quantity of liquid.

The measuring cup 10 can be fabricated from a thermoplastic material selected from the group of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), polypropylene (PP) and combinations thereof. The thermoplastic material may be a recycled thermoplastic material or combination of virgin thermoplastic material and recycled thermoplastic material. The measuring cup 10 can be a single layer of material or multiple layer of the same or different materials. The measuring cup 10 can comprise more than about 1%, optionally more than about 20%, optionally from about 1% to 100% by weight carbon from carbon capture. The measuring cup 10 can comprise pulp. Pulp can be constitutive material of the measuring cup 10 or an additive to the constitutive material of the measuring cup 10. The measuring cup 10 can be fabricated from paper or paper board or other material comprising pulp.

Pigments, colorants, and laser absorption additives may be added to the material used to construct the measure cup.

Titanium dioxide and carbon black are pigments commonly used to opacify thermoplastic materials.

A laser, such as a pulse laser, including a short pulse laser, may be used to form the chemically or structurally modified bits of the dosing indicium 60 described herein. Suitable choice of laser wavelength in combination with pigments/colorants may suitably laser mark the surface, by chemically or structurally modifying the surface of the article. Laser absorption additives can be added to provide for more vivid and readable laser marks than can be achieved without such additives. These laser absorption additives generally absorb the laser energy specific to the wavelength followed by initiating a color change to the surrounding matrix (via local heating to cause carbonization, foaming, etc.) or the laser absorption additive itself undergoes a chemical or physical change. Examples of laser absorption additives include: titanium dioxide ($TiO_2$), antimony tin oxide (ATO), ATO coated substrates such as mica, $Sb_2O_3$, carbon black, bismuth oxide, mixed metal oxides, metal phosphates, effect pigments, zero valent metals, and mixtures thereof. An example of laser marking laser absorption additives are those commonly sold under the tradename IRIOTEC, by Merck KGaA of Darmstadt, Germany, and LASERSAFE by Eckart GmbH.

Lasers for use in the present invention are commercially available and include nano, pico, femto second lasers. These short pulse lasers can emit pulses applied at high energy-densities and high repetition rates, the high energies and high repetition rates are important to allow laser-marking the measuring cup 10 at high speed. The laser marks themselves, which are the chemically or structurally modified bits, include marks made by oxidation, reduction, ablation, etching, foaming, carbonization, and chemical modification including bleaching to the constitutive material of the measuring cup 10.

Figure 2:
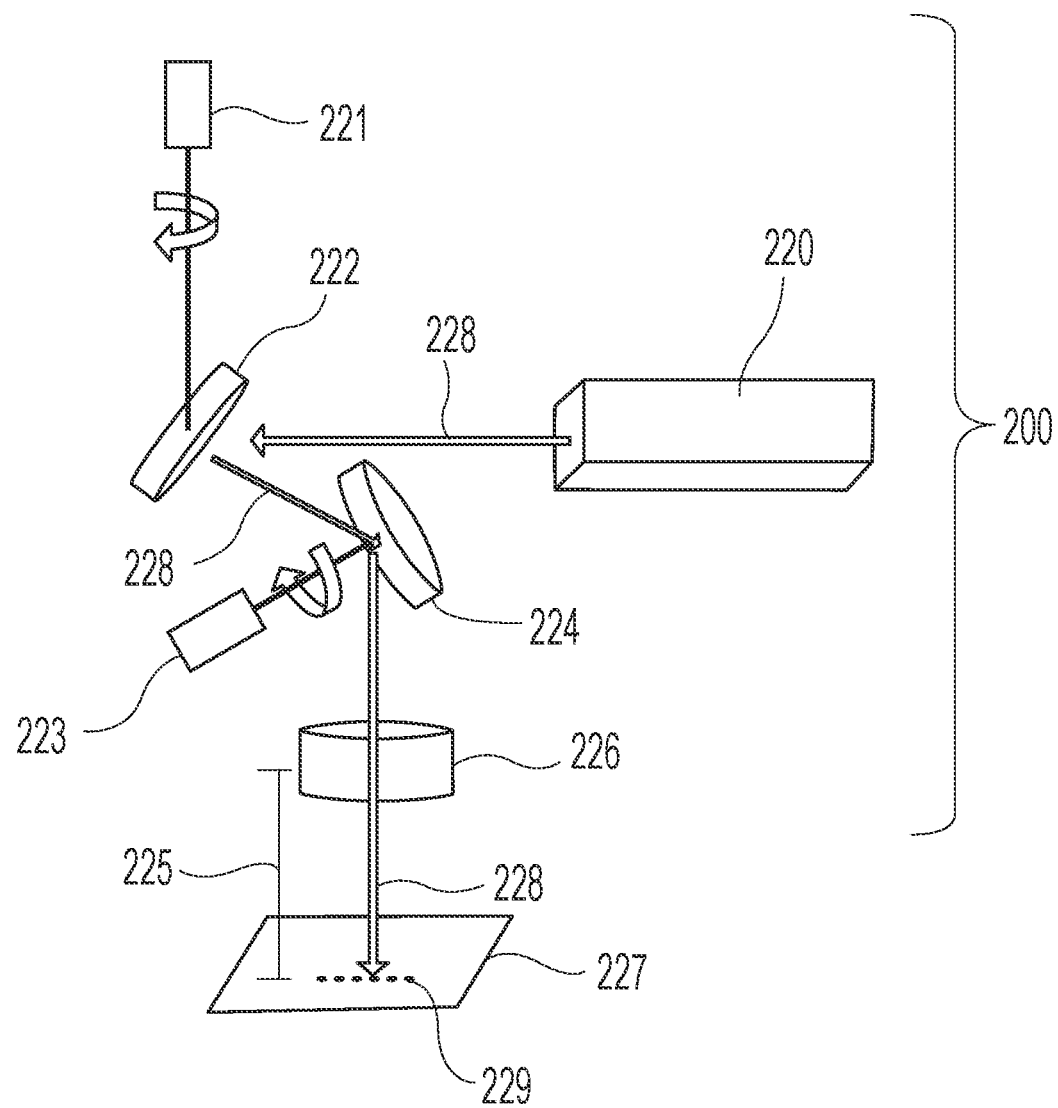
FIG. 2 is a schematic view of a lasing apparatus.

Any suitable laser can be used to mark the measuring cup 10 with chemically or structurally modified bits. An example of a lasing apparatus 200 comprising a laser 220 useful for marking a measuring cup 10 is illustrated in FIG. 2. The lasing apparatus 200 includes a laser 220 which may be any laser capable of generating sufficient energy to form chemically or structurally modified bits of the measuring cup 10, such as a UV laser, having power in the range of 1 W to 60 W, and a laser wavelength of 355 nanometers or an IR marking laser, having a power in the range of 1 W to 300 W, and a laser wavelength of 1064 nanometers. Such lasers are available from various suppliers, including an IPG ULPN-355-10-1-3-M marker or YLPN-1-1×350-50-3M MOPA module, available from IPG Photonics of Oxford, MA, United States. Other makes and types of lasers are also possible and different power ranges and settings may be used. The lasing apparatus can include optics that can be used to direct the laser beam, change the energy density and/or spot size of the laser beam 228, as desired. The lasing apparatus can employ a polygon scanner, such as a high throughput raster processing scanner system from Next Scan Technology. Such a scan system can employ a rotating polygon mirror for row scanning. The mirror surface can be a square that is marked in its entirety repetitively.

In the lasing apparatus 200 depicted in FIG. 2, the laser 220 projects laser beam 228 onto X-mirror 222 which is rotated by X-galvo 221. X-mirror 222 and X-galvo 221 collectively form an X-galvo set. Laser beam 228 is then projected onto Y-mirror 224 which is rotated by Y-galvo 223. Y-mirror 224 and Y-galvo 223 collectively form a Y-galvo set. The galvo sets work together to direct laser beam 228 to the desired chemically or structurally modified bit 229 to be marked on article 227. Before laser beam 228 reaches article 227 to chemically or structurally modify the measuring cup 10 it will typically go through a lens 226. The distance from lens 226 to article 227 is the focal length 225. Mirrors having a low mass that can be accelerated or moved quickly by their associated galvo can be helpful.

The combined optics of the lasing apparatus 200 may function so as to sweep the laser beam 228 across the surface of the measuring cup 10 in successive passes, marking the surface with chemically or structurally modified bits in a pattern. The laser beam 228 may sweep across the article along a first row in the grid in the X-direction, being directed by the X-mirror 222, while emitting pulses. The combination of the sweep-speed of the X-mirror 222 and the repetition rate of the laser pulses, then, determines the spacing of chemically or structurally modified bits along the X-direction. The laser 220 may emit a pulse while sweeping across the measuring cup 10 at a given location thereby resulting in a chemically or structurally modified location, or the laser 220 may omit a pulse while sweeping across the measuring cup 10 at a given location thereby resulting in an unmarked location. The laser beam 228 may be swept across the measuring cup 10 at a constant velocity while emitting and/or omitting pulses.

The laser beam 228 may subsequently sweep across the measuring cup 10 along a second row of the grid (such as a row adjacent to the first row) while emitting pulses. The laser beam 228 may sweep across the first and seconds rows in the same direction or in opposite directions. For example, the laser beam 228 may sweep across the first row from "left-to-right" and across the subsequent/adjacent row from "right-to-left".

Frequency or Repetition Rate, measured in Hz, is the number of laser pulses a single laser can deliver in a second. For instance a 1 MHz laser delivers 1,000,000 pulses per second where a 100 kHz repetition rate laser delivers 100,000 pulses per second. This lever can be important for processing a particular laser job in a short period of time. The more pulses per unit time available correlates inversely to the cycle time within a given row for a particular job. Pulse Energy is the amount of energy a single laser pulse contains and is typically measured in µJ or mJ. Average power=pulse energy (J)*rep rate (Hz or 1/sec). Typically, pulse energy is in the range of 5 µJ to 2000 µJ (2 mJ), optionally in the range of 7 µJ-1000 µJ, and optionally 10 µJ-300 µJ. Peak power is equal to pulse energy divided by pulse duration, and can be less than 100 nanoseconds, less than 50 nanoseconds, less than 20 nanoseconds, less than 10 nanoseconds, or less than 1 nanosecond. Therefore, pulse energy and pulse duration are linearly related to peak power. Shorter pulse durations like nanosec, picosec and femtosec lasers allow for very higher peak power which aid in the ability to mark articles.

Those skilled in the art will appreciate that the laser energy must be absorbed by the material constituting the measuring cup 10 for the measuring cup 10 to be marked with a chemically or structurally modified portion.

The laser energy may be absorbed by the material, optionally thermoplastic material, constituting the measuring cup 10 or by a laser absorption additive incorporated in the material constituting the measuring cup 10. As such, the wavelength of the laser 220 must overlap with an absorption band in the spectrum of at least one of the material, optionally thermoplastic material, or a laser absorption additive incorporated into the measuring cup 10. For example, pulse lasers utilizing 355 nm (UV) may be absorbed by $TiO_2$ added to the article, 532 nm (Green) may be absorbed by precious metal nanoparticles like gold, silver and copper, and 9-12 μm (IR) may be absorbed by PET which may be the base material of the article. Other pairings of laser wavelengths with the material, optionally thermoplastic material, or laser absorption additives for the measuring cup 10 exist and are contemplated herein.

The measuring cup 10 can be marked with chemically or structurally modified bits by the process of foaming, carbonization, ablation, etching, reduction, oxidation, or chemical modification. The term foaming means a process whereby the laser beam melts and vaporizes a portion of material which creates gas bubbles that become trapped or partially trapped within the molten resin and reflect the light diffusely when cooled. Foaming will generally produce lighter markings in areas that the laser has marked, and this method can be used for dark colored or opaque materials and translucent materials. The term translucent as used herein means the material, layer, article, or portion of the article being measured has total luminous transmittance of greater than 0% and less than or equal to 90%. The term transparent as used herein means the material, layer, article, or portion of the article being measured has a total luminous transmittance from greater than 90% to 100%. Translucent and transparent materials are light pervious. The term opaque as used herein means the material, layer, article, or portion of the article being measured has total luminous transmittance of about 0%. The total luminous transmittance is measured in accordance with ASTM D1003.

Carbonization is a chemical modification process that produces strong dark contrasts on bright surfaces, and is commonly used on carbon-containing polymers or biopolymers or natural materials such as such as leather and wood and pulp-based materials. When carbonizing a material, the laser heats up the surface (minimum 100° C.) emitting oxygen, hydrogen, or a combination decomposition products. Carbonizing generally leads to dark chemically modified bits having higher carbon content, that is elemental carbon content or higher ratio of carbon to hydrogen, versus the original material or adjacent unmodified constituent material, making it a good choice for lighter colored articles, while the contrast may be less apparent on darker materials.

Reduction and oxidation chemical modification processes involve the laser energy changing the oxidation state of at least one of the article's components such as a laser absorption additive or opacifying pigment, resulting in a discoloration or color change that is viewed as a chemically modified bit. For instance, the energy imparted from a UV laser can promote the reduction of $TiO_2$ to form a titanium sub-oxide where the oxidation state of titanium has been reduced to less than +4 and whereby this reduction results in a color change from colorless to blue, dark blue to black.

There are additional methods of marking a measuring cup 10. For example, annealing is a laser process available for metals and other materials. The heat produced from the laser beam chemically modifies the constituent material below the surface of the constituent material by way of oxidation, which results in a change of color on the material surface.

Staining is another chemical modification process achievable as the result of the chemical reaction created on materials when the heat of a laser beam is applied to the constituent material. Variations in color shades will depend on the compositions of the materials being stained. For example, lighter colored plastic materials can often discolor during the laser etching process, resulting in dark marking from the soot particles produced.

Laser engraving is the process of removing material as the workpiece surface is melted and evaporated by the laser beam, which produces an impression in the surface being engraved. Laser engraving is a structural modification of the sidewall 40 and may also be a chemical modification of the sidewall 40.

Removing material, sometimes referred to as etching, is a process where the laser beam removes the top-most surface of a substrate or coating that was previously applied to the article's substrate. A contrast is produced as a result of the different colors of top coat and substrate or different topography and texture of the etched region versus the adjacent region. Etching is a structural modification of the sidewall 40. Although there is no specific limitation on the maximum or minimum depth of an etch, etching depths are typically in the range of about 0.001 mm to about 2.0 mm, including any depth within the range, such as for example, 0.010 mm, 0.075 mm, 0.100 mm, 0.200 mm, 0.300 mm, 0.400 mm, 0.500 mm, 1.0 mm, 1.5 mm and others.

Bleaching or photobleaching (sometimes termed fading), which is a chemical modification, is the photochemical alteration of a chromophore (such as in a pigment or dye) or fluorophore molecule such that it's inherent color is permanently lost and/or is unable to fluoresce. This is caused by cleaving of covalent bonds or non-specific reactions between the chromophore/fluorophore and surrounding molecules.

Spot-size in laser marking relates to the focused area where the laser beam contacts the article. Spot size is the diameter of a round spot, or the average of 2 to 4 diameters taken around and within an irregularly shaped spot so that the computed diameter corresponds approximately to a circle having an area approximately equal to the area of the spot. The spot size can be modified by focusing or de-focusing the laser beam, but the fluence (energy per unit area) within the spot decreases as the spot is de-focused. Theoretically, the minimum spot-size achievable with any laser is the wavelength of the laser itself. As a practical matter, the minimum spot size achievable with pulse lasers may be from about 7 μm to about 20 μm. The spot sizes can be in the range of from about 5 μm to about 300 μm, optionally 10 μm to about 150 μm, optionally from about 20 μm to about 100 μm, optionally from about 30 μm to about 80 μm, optionally from about 40 μm to about 60 μm. Another way to think about spot size in a marking context is the size of the paintbrush an artist is using to paint. If fine detail is desired, then smaller spots sizes may be used. If larger areas are to be marked large spot sizes may be used. However, laser marking mechanisms require a minimum fluence to achieve the desired mark so balancing pulse energy, pulse duration, pulse overlap and spot size may be important.

Further, there is a region around the laser-contact spot which may also be heated in the course of the marking, though little or no material may be marked. The heat-effected zone can still yield effects such as crystallization which can impact the appearance and/or performance of the target material. Short pulse lasers (nano-second) have some heat effected zone, although substantially less than microsecond pulsed or continuous wave (CW) type lasers, (e.g. CO2, longer pulse IR lasers, etc.). Pico and femto second lasers are often referred to as ultra-short pulse and have very little to no heat effected zone. This capability can be helpful to control the thermal effects of the marking.

Geometry of the bit spacing can also be a key contributor to the cycle time and fluence or energy per unit area provided to an article. For example, the spacing between bits may be such that the bits do not overlap at all and have 0% overlap. At 0% overlap, each individual laser pulse is responsible for the energy provided to a chemically or structurally modified bit of the measuring cup 10. If the laser does not have sufficient pulse energy or peak power to form the desired chemically or structurally modified bit, then the pulse spacing can be decreased by an amount such that the chemically or structurally modified bits overlap in either one or both the X and Y-directions. Overlapping the chemically or structurally modified bits includes providing more than one laser pulse to the area of the measuring cup 10 in which the chemically or structurally modified bits overlap which, provides higher fluence or energy per unit area to that portion of the article. Additionally, pulse spacing can be an important lever for cycle time. If a laser has a fixed repetition rate or pulse frequency, then to achieve the lowest process time the pulses need to be spread out as much as possible while still achieving the desired mark type and mark contrast.

Pulse duration is the length of time a pulse remains continuously above half its maximum value. The shorter the pulse, the higher the peak power can be created with a common average power. This is because average power=pulse energy (J)*rep rate (Hz or 1/sec). Peak power is equal to pulse energy divided by pulse duration. Therefore, when pulse duration gets significantly smaller, the resulting peak pulse power is significantly higher. This peak power enables improved carbonization, foaming, ablation, etching, oxidation, reduction, etc. on the targets being marked. Short and ultrashort (pico/femto) pulse lasers take advantage of this phenomenon to be able to mark parts and can drive marking mechanisms typically not found in longer pulse lasers.

As mentioned, the lasing apparatus 200 sweeps the laser beam 228 across the measuring cup 10 while the laser pulses are either emitted from the laser or no pulse is emitted. A marked location occurs when the laser 220 emits a pulse to a given location and no location is marked when the laser does not emit a pulse to a given location. The laser beam 228 may be swept across the measuring cup 10 at a constant velocity while the repetition rate of the laser is constant, so the spacing of the bits will be regular in the direction in which the laser beam is swept across the measuring cup 10 (i.e. the X-direction).

The laser beam 228 may be swept across the measuring cup 10 in subsequent rows. The laser beam may be swept from left-to-right or from right-to-left and may sweep in the same direction as it is moved from row to row or may be swept in alternating directions as it moves from row to row. A key contributor to reducing cycle time includes sweeping the laser beam 228 in alternating directions as it moves from row to row. The rows may be generally parallel to one another. The distance between adjacent rows is the Y-distance. The rows can be orthogonal to or substantially orthogonal to the longitudinal axis of the measuring cup 10. The rows can be parallel to or substantially parallel to the longitudinal axis of the measuring cup 10. The rows can be aligned at an angle relative to the longitudinal axis of the measuring cup 10.

The locations in adjacent rows may lie directly above/below one another or may be offset relative to one another. If the offset is too great, the image produced by the laser marking (i.e. an icon or alphanumeric character) may appear blurred and may be illegible to the consumer or to a machine.

Various bitmapped patterns are illustrated in FIGS. 3, 4, 5 and 6. The bitmapped pattern can comprise at least two rows R (R1, R2, R3, . . . Rn) of bits. The bits 80/potential locations 82 within a row R can be irregularly spaced apart from one another or regularly spaced apart from one another. The bits 80/potential locations 82 amongst rows R can be irregularly spaced apart from one another or regularly spaced apart from one another. Optionally, the bits 80/potential locations 82 can be spaced apart from one another in a regular pattern within and amongst the rows R of bits. Optionally, the bits 80/potential locations 82 amongst the rows can be in registration with one another.

Figure 3:
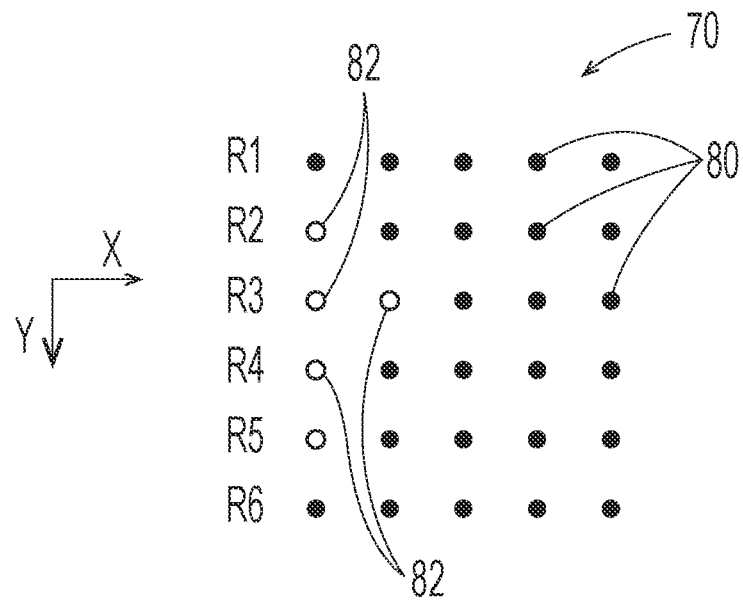
FIG. 3 is a bitmapped pattern in a square pattern.

In FIG. 3, the bitmapped pattern 70 is a square pattern of chemically or structurally modified bits 80/potential locations 82. For reference, potential locations 82 that could be marked are illustrated as empty circles. The bitmapped pattern 70 in FIG. 3 has six rows R of bits 80/potential locations 82 illustrated as R1 to R6 in the Y-direction. Within each individual row R of the bitmapped pattern 70 of FIG. 3, adjacent bits 80/potential locations 82 are spaced apart from one another in a regular pattern. That is, adjacent bits 80/potential locations 82 in a row R are spaced apart from one another by the same distance.

In FIG. 3, the rows R of bits 80/potential locations 82 illustrated as R1 to R6 are in registration with one another and the bits 80/potential locations 82 are spaced apart from one another in a regular pattern amongst rows R. That is, the bits 80/potential locations 82 are substantially in line with one another in the Y-direction. In FIG. 3, the spacing between adjacent bits 80/potential locations 82 within a row R is the same as the spacing between adjacent rows R. Such bitmapped pattern 70 is a square bitmapped pattern 70. Optionally, rows R of the bitmapped pattern 70 may be spaced apart from one another in the Y-direction by a distance greater than the spacing amongst adjacent bits 80/potential locations 82 within a single row R. The bitmapped pattern 70 can be a rectangular bitmapped pattern 70 in which the rows of bits 80/potential locations 82 are spaced apart by a distance greater than the spacing between adjacent bits 80/potential locations 82 with a single row of bits 80/potential locations 82. When rows R of bits 80/potential locations 82 are in registration with one another and the bits 80/potential locations 82 are spaced apart from one another in a regular pattern amongst rows R, the bitmapped pattern can be a square or rectangular bitmapped pattern 70.

Optionally, the bits 80/potential locations 82 amongst rows R can be in registration within one another and the spacing between adjacent rows R can vary. For example, the spacing between pairs of rows, for example R1:R2, R2:R3, R3:R4, et cetera, can differ from one another or differ from adjacent pairs of rows R.

Figure 4:
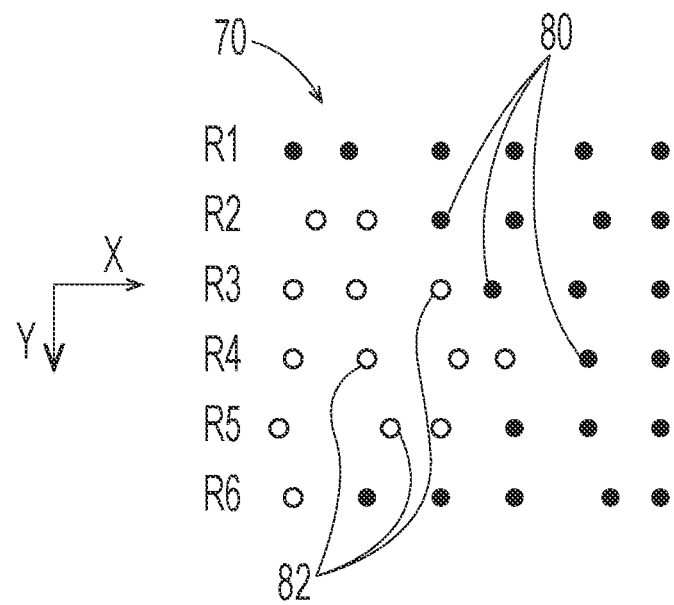
FIG. 4 is bitmapped pattern in which the bits within rows of the bitmapped pattern are nonuniformly spaced.

Optionally, the bits 80/potential locations 82 within rows R of the bitmapped pattern 70 may be nonuniformly spaced, by way of nonlimiting example as shown in FIG. 4. Within a row R of bits 80/potential locations 82, the spacing between adjacent bits 80/potential locations 82 in the row R may differ from one another. One or more rows R of bits 80/potential locations 82 may be in registration with one another. Optionally, each row R may have nonuniformly spaced bits 80/potential locations 82 and the spacing of bits 80/potential locations 82 within each row R can differ from the spacing of bits 80/potential locations 82 in adjacent rows R. Such an arrangement can result in there being no consistent spatial relationship between bits 80/potential locations 82 with a single row R or amongst rows R.

Figure 5:
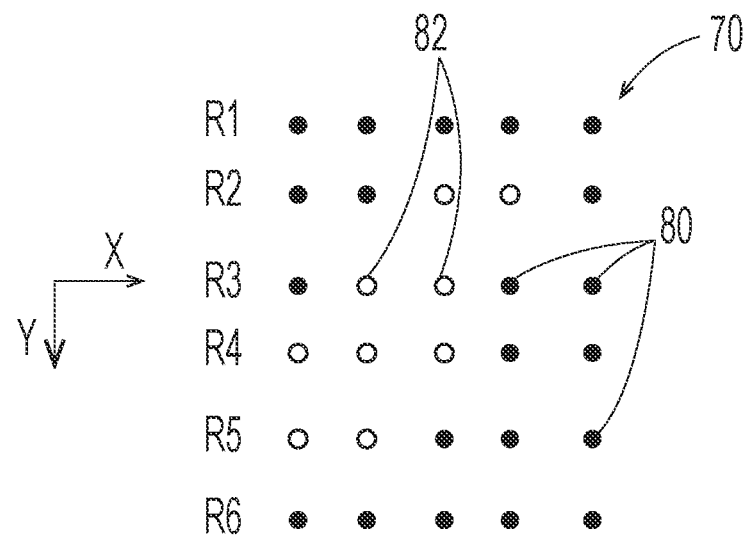
FIG. 5 is bitmapped pattern in which the bits amongst rows of the bitmapped pattern are nonuniformly spaced.

The bits 80/potential locations 82 can be spaced apart from one another in an irregular pattern amongst rows R for example as shown in FIG. 5 by way of nonlimiting example. The spacing of bits 80/potential locations 82 amongst rows R can be smaller in portions of the dosing indicium requiring greater resolution than in portions that do not require such a high resolution.

Figure 6:
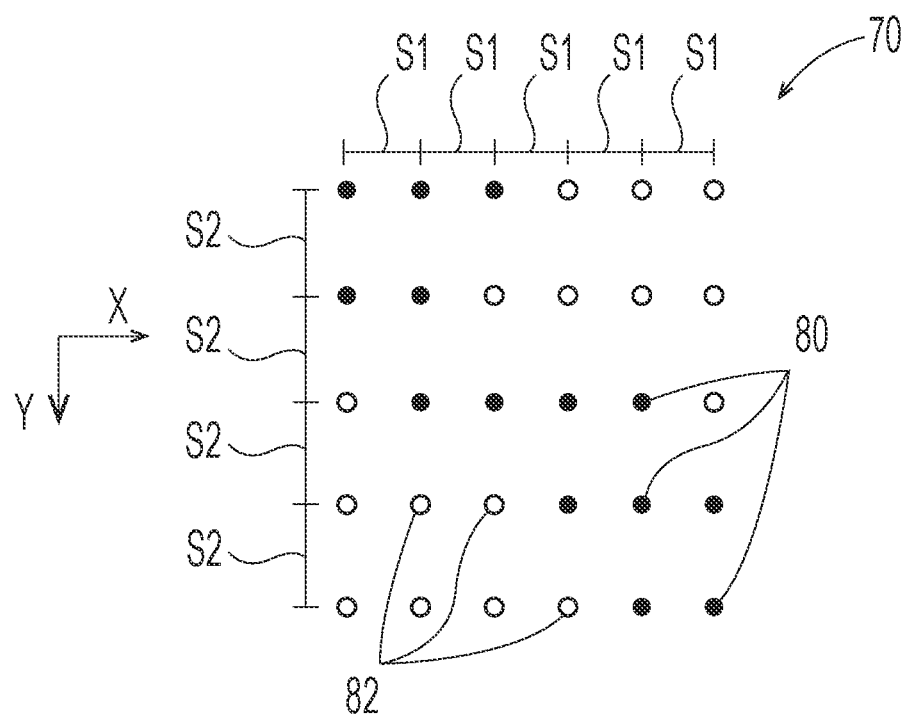
FIG. 6 is a bitmapped pattern in which the bits within rows are center to center spaced apart from one another by a first spacing and the bits amongst rows are spaced apart from one another by a second spacing.

Bits 80/potential locations 82 constituting each of the rows R can be center to center spaced apart from one another by a first spacing S1 and the rows can spaced apart from one another by a second spacing S2, by way of nonlimiting example as shown in FIG. 6. The second spacing S2 can differ from the first spacing S1. The second spacing S2 can be greater than, equal to, or less than the first spacing S1. Without being bound by theory, it is thought that that the spacing between rows R can be greater than the spacing amongst bits 80/potential locations 82 within a row and still produce well defined dosing indicia 60 and such dosing indicia 60 can be marked at a higher speed than dosing indicia 60 having rows R that are spaced apart by the same distance as the spacing amongst bits 80/potential locations 82 within a row R. The spacing between rows R can be greater than or less than the spacing amongst bits 80/potential locations 82 within rows R.

Aspects of high speed laser marking on articles and high speed laser making processes for marking articles are disclosed in U.S. patent application Ser. Nos. 17/963,214, 17/963,215, 17/987,893, and 17/987,895.

Figure 7:
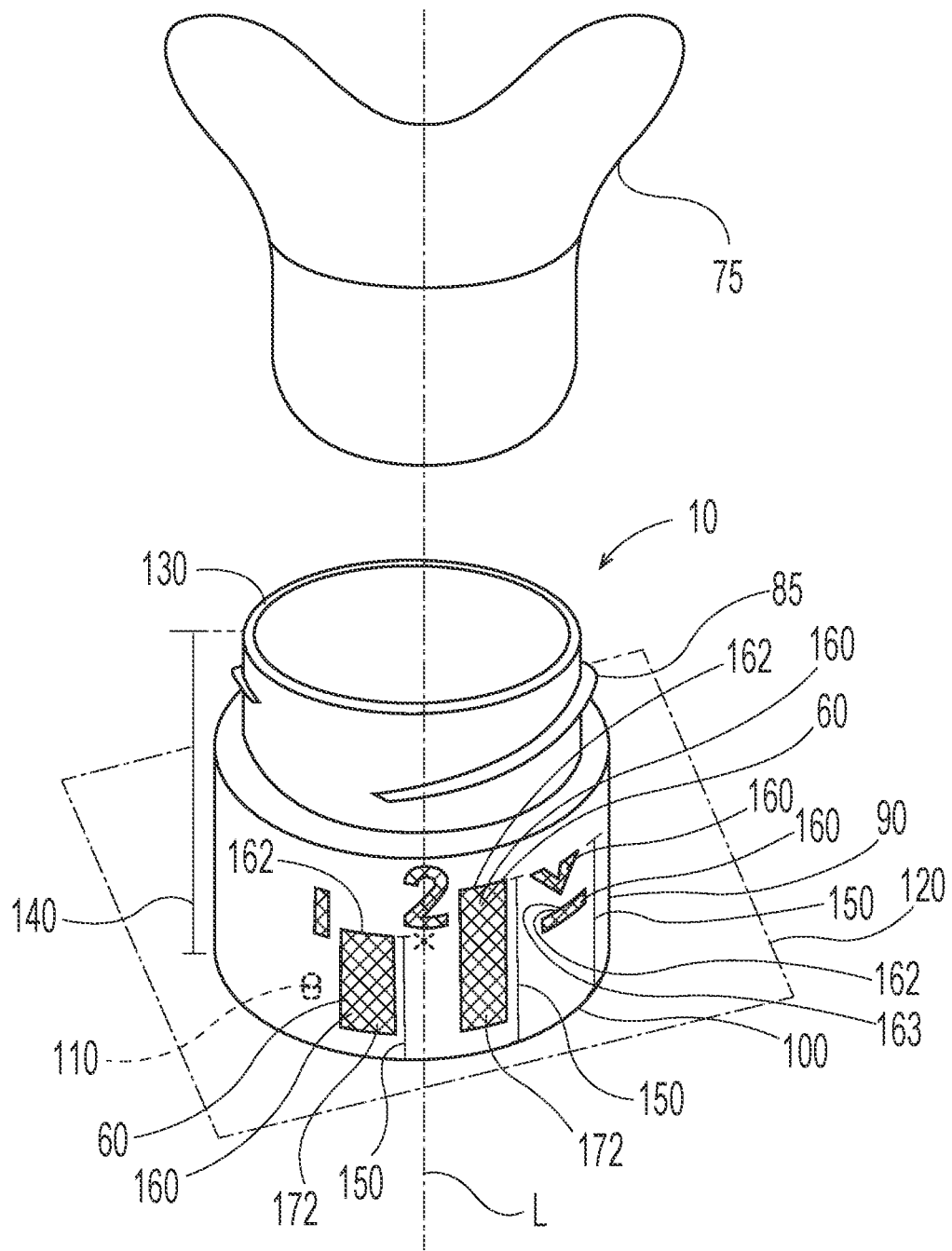
FIG. 7 is container and measuring cup.

The measuring cup 10 can be a closure 100 of a container 75 that is removably engaged with the container 75, as shown in FIG. 7. The measuring cup 10 can comprise threads 85. The threads 85 can be on the interior surface 50 or on the exterior surface 90. Optionally the measuring cup 10 can be removably engaged with a container 75 via a tongue and groove fitting. Optionally, the threads 85 can be on an inner collar, for example an inner collar around the longitudinal axis L, extending from the bottom end 20 towards the open end 30. Threads 85 on an inner collar can be oriented towards the longitudinal axis L or oriented away from the longitudinal axis L. The inner collar can be positioned between the sidewall 40 and the longitudinal axis L.

In use, the measuring cup 10 can function to contain the contents of the container 75 within the container 75. When the closure 100 is removed from the container 75 and the open end 30 is oriented upwardly, the closure 100 can function as the measuring cup 10 into which the contents of the container 75 can be dispensed.

For containers 75 in which the contents are solid objects, such as particulate laundry products and the like, the bottom end 20 need not be a closed bottom end. For example, the bottom end 20 can comprise an aperture 110. The aperture 110 can provide a pathway through which the consumer can sample the aroma of the contents of the container 75. If the closure 100 is rapidly fitted to the container 75 the aperture 110 can provide a pathway for gas to escape so that the pressure within the container 75 is ambient pressure. For contents that off-gas over time, the aperture 110 can provide for a pathway for such off gas to escape from the container 75 or through which the scent of the contents of the container 75 can be sampled. The aperture 110 can have an open area that is smaller than the cross-sectional area of individual particles that are contained in the container 75. The aperture 110 can have an open area less than about 0.0001 $m^2$, optionally less than about 0.00001 $m^2$, optionally less than about 0.000001 $m^2$.

The bottom end 20 can define a resting plane 120 of the measuring cup 10. The resting plane 120 is the plane upon which the bottom end 20 of the measuring cup 10 rests when the open end 30 is oriented upwardly. The bottom end 20 may be flat or substantially flat such that the entirety of the bottom end 20 rests on the resting plane 120. Optionally, the bottom end 20 may be shaped to rest upon a portion or portions of the bottom end 20 that are flat and in plane with one another such that the bottom end 20 can rest stably on a flat surface. Optionally, the bottom end 20 may rest upon 3 or more contact locations that are in plane with one another such that the bottom end 20 can rest stably on a flat surface. When the bottom end 20 is resting on a horizontal table, the resting plane 120 is coincident with the surface of the horizontal table upon which the bottom end 20 rests. Optionally, the bottom end 20 may be rounded. For example the bottom end 20 can be a dome or part of a dome. The measuring cup 10 in its entirety can be a domed shape.

The open end 30 can be defined by a peripheral rim 130. The sidewall 40 can have a sidewall height 140 between the resting plane 120 and the peripheral rim 130. The sidewall height 140 is measured orthogonal to the resting plane 120. The sidewall height 140 is a scalar quantity.

The dosing indicium 60 can have a dosing indicium height 150. The dosing indicium height 150 is measured orthogonal to the resting plane 120. The dosing indicium height 150 is a scalar quantity. The dosing indicium height 150 can be measured over a maximum extent of the dosing indicium orthogonal to the resting plane 120 and can be from about 20% to about 100% of the sidewall height 140 measured at the dosing indicium 60. A dosing indicium 60 having such a height relative to the sidewall height 140 can be easy for the user to identify on the exterior surface 90 of the measuring cup 10. A bitmapped pattern 70 can provide an advantage over a vector generated dosing indicium 60 in that for the same or similar desired overall visual impression for the dosing indicium 60, a bitmapped pattern 70 can be marked on the measuring cup 10 can often be faster than a vector generated dosing indicium 60, which ultimately reduces the cost of production of the measuring cup 10. Furthermore, at a given production rate per measuring cup 10, a larger bitmapped pattern 10 can be provided than would otherwise be markable using a vector process. A larger bitmapped pattern 10 corresponds to a larger dosing indicium 60, which can be easier to use than a smaller dosing indicium 60 that might be providable using a vector process. High speed marking of measuring cups 10 using vector processes tends to be limited to marking thin lines that are substantially parallel to the resting plane 120 and may only include numbers being in a small font size (e.g. 14 point or less), which may be difficult for the user to see.

Vector processes tend to be slow because of the multiple fixed short start and stop points that require the galvo sets to spend the majority of the time accelerating to the user set maximum velocity which is determined by the pulse spacing multiplied by the repetition rate and the length of the vector distance. Lengthy vector distances allow the vector lasing apparatus to reach its maximum velocity, while shorter vector distances has the lasing apparatus constantly accelerating and decelerating and never reaching maximum velocity resulting in longer marking times.

The vector process is less accurate than the bitmap process at high speeds, due to the acceleration/de-acceleration of the galvo sets steering the laser beam. Specifically, the location of each laser mark must be communicated from a computer driven software to the laser marking apparatus and such communication must be updated during the marking of the dosing indicium 60, for example, as the laser beam traverses a given row. Typical update frequencies for this communication are about 10 µs, so a laser outputting pulses with a repetition rate of 100 kHz would allow for an update in the communication for each individual laser pulse/mark. As the velocity of the laser beam across the surface of the article increases, repetition rates of greater than 100 kHz are required to achieve the desired spacing amongst bits 80 within the rows, and each update from the software must now communicate the location of multiple marked bits 80 (or potential locations 82). While the calculations can be performed nearly instantaneously, in the extremely fast time-domains of high-speed laser marking, the galvos cannot respond as quickly, and the accelerate/de-accelerate profile of the vector process results in a significant number of misplaced marked bits 80 within a given row R.

For a given area of dosing indicium 60 that is more than a straight line, a bitmapped pattern 70 can be produced more quickly than a vector marked dosing indicium 60. From a practical perspective, given the production speed limitations of vector processes, using a bitmapped pattern 70 can enable a larger dosing indicium 60 to be produced than could be produced using a vector process in a reasonable amount of time. A bitmapped pattern 70 constituting a dosing indicium 60 that is a continuous region present on more than about 0.5% of the exterior surface 90 of the sidewall 40 can be practical to mark at high speed, meaning that a high production rate of marked measuring cups 10 is possible. The dosing indicum 60 can be a continuous region present on more than about 0.5%, optionally more than about 0.75%, optionally more than about 1%, optionally more than about 1.25%, optionally more than about 1.5% of the interior surface, optionally more than about 3% of the exterior surface 90, optionally more than about 5% of the exterior surface 90. The measuring cup 10 can comprise more than one dosing indicium 60 and the dosing indicia 60 combined can be present on more than about 3%, optionally more than about 3.5%, optionally on more than about 4%, optionally on more than about 5% of the exterior surface 90, optionally more than about 8% of the exterior surface 90. A larger dosing indicium 60 can be easier for the user to use to measure the amount of product dispensed into the measuring cup.

The sidewall 40 can extend around a longitudinal axis L. The dosing indicium 60 can comprise a continuous or discontinuous marked portion 160 parallel to the resting plane 120. The marked portion 160 can traverse more than about 5 degrees of the sidewall 40 about the longitudinal axis L. The longitudinal axis L can project through the bottom end 20 and the open end 30. The sidewall 40 can be unmarked immediately adjacent the dosing indicium 60 along the marked portion 160. Such a dosing indicium 60 is large enough to be visually apparent to the user and can provide for a horizontal measuring line that corresponds with the desired volume of the contents of the container 75 to be used in a measured quantity. Providing an unmarked portion immediately adjacent the dosing indicium 60 can make the dosing indicium 60 visually apparent against an unmarked background that is part of the of the sidewall 40.

The marked portion 160 can have a boundary 162 parallel to the resting plane 120. The sidewall 40 can be unmarked along the boundary 162. The sidewall 40 immediately adjacent the dosing indicium 60 can be unmarked along the boundary 162 of the dosing indicium 60 that is oriented away from the resting plane 120. The dosing indicum 60 can comprise a continuous or discontinuous marked portion 160 that extends to the boundary 162 of the dosing indicium 60 that is oriented away from the resting plane 120 and is parallel to the resting plane 120. Optionally, the dosing indicium 60 can be a line or dashed line 163 parallel to the resting plane 120 and traversing more than about 5 degrees of the sidewall 40 about the longitudinal axis L. The boundary 162 can traverse more than about 5 degrees of the sidewall 40 about the longitudinal axis L. Optionally, boundary 162 can traverse more than about 10 degrees, optionally more than about 15 degrees, optionally more than about 20 degrees, of the sidewall 40 about the longitudinal axis L. The longer the boundary 162 about the longitudinal axis L the easier it might be for the user to recognize the boundary 162 and fill the measuring cup 10 up to the boundary 162 with the desired volume of liquid or other material. The dosing indicium 60 can be a continuous region 172. For example, the dosing indicium 60 can be a bitmapped pattern 70 constituting a measuring bar. Optionally, the dosing indicium 60 can be a bitmapped pattern 70 constituting a line parallel to the resting plane 120.

The bits 80 forming the dosing indicium 60 can comprise gas bubbles. The gas bubbles can be distributed in the bits 80 in the material constituting the sidewall 40. During formation of the gas bubbles, some of the bubbles may erupt from the exterior surface 90 of the sidewall 40 and result in the exterior surface 90 of the sidewall 40 having a rough surface. The dosing indicium 60 can comprise more gas bubbles per unit area than portions of the sidewall 40 adjacent the dosing indicium 60.

The bits 80 forming the dosing indicium 60 can have a higher carbon content than the sidewall 40 adjacent the dosing indicium 60. Such bits 80 can be formed with a laser that carbonizes the portion of the sidewall 40, for example the exterior surface 90 or the exterior surface 90 and material underneath the exterior surface 90, at which the laser is directed. Optionally, the sidewall 40 can comprise an absorption additive. The absorption additive within the bits 80 can have a different oxidative state than the absorption additive within the sidewall 40 adjacent the dosing indicium 60. The oxidative state of the absorption additive can be higher or lower relative to the oxidative state of the absorption additive in the sidewall 40 adjacent the dosing indicium 60. Optionally, the bits 80 forming the dosing indicium 60 can be ablated or etched relative to the sidewall adjacent the dosing indicium 60.

The sidewall 40 of the measuring cup 10 can be light pervious. A light pervious sidewall 40 can be practical for providing the user the ability of the user to see the contents being measured in the measuring cup 10 when the user views the exterior surface 90 of the sidewall 40.

To provide for a dosing indicium 60 that is readily perceptible by the user it can be practical that there be a difference in lightness between the exterior surface 90 coincident with the dosing indicium 60 and the exterior surface 90 remote from the dosing indicium 60. Comparison of a continuous area such as dosing indicium 60 can be accomplished by automatic thresholding and masking the Region of Interest (ROI). In the CIELAB color space framework, the difference in lightness can be characterized by $L^*$. The average $L^*$ of the ROI can be found using a scanner setup such as described herein by the 95% Delta Color Value Measurement Method. The exterior surface 90 can have a $|\Delta L^*_{outside}|$ that is the average value of $L^*$ of the exterior surface 90 coincident with the dosing indicium 60 minus the average value of $L^*$ of a similar sized area on the exterior surface 90 remote from the dosing indicium 60. The absolute value is used to account for a dark indicium on a light surface or a light indicium on a dark surface. $|\Delta L^*_{outside}|$ can be greater than about 1, optionally greater than about 3, optionally greater than about 10.

The exterior surface 90 can have a 95% Bin Value Absolute $\Delta L^*$ greater than about 1, optionally greater than about 3, optionally greater than about 5, optionally greater than about 10, according to the 95% Delta Color Value Measurement Method using either a white backing or a black backing. The 95% Delta Color Value Measurement Method uses a mixture of indicium 60 and unmarked area for the ROI. Optionally, the exterior surface 90 can have a 95% Bin Value Absolute ΔL* greater than about 3, optionally greater than about 5, optionally greater than about 10, according to the 95% Delta Color Value Measurement Method using either a white backing or a black backing. Optionally, the exterior surface 90 can have a 95% Bin Value ΔE greater than about 1 according to the 95% Delta Color Value Measurement Method using either a white backing or a black backing. Optionally, the exterior surface 90 can have a 95% Bin Value ΔE greater than about 3, optionally greater than about 5, optionally greater than about 10, according to the 95% Delta Color Value Measurement Method using either a white backing or a black backing. Without being bound by theory, an exterior surface 90 having a dosing indicium 60 as such is thought to be easily identified and used by users.

The measuring cup 10 can comprise threads 85 or lugs. The threads 85 or lugs can be positioned on the exterior surface 90 or interior surface 50 of the sidewall 40. The threads 85 or lugs can be oriented towards the longitudinal axis L or away from the longitudinal axis L. The threads 85 or lugs can be nearer to the open end 30 than the bottom end 20. The threads 85 or lugs can be constituted by a continuous or intermittent thread around the exterior surface 90 or the interior surface 50. The threads 85 or lugs can be longitudinally interior of the sidewall 40. Lugs can be employed on the interior surface 50 of the sidewall 40 as a component of a bayonet fitting that can couple the measuring cup 10 to the neck of the container 75 having the complementary component of a bayonet fitting.

The measuring cup 10 can comprise two dosing indicia 60 positioned radially about the longitudinal axis L, or even at radially opposite positions about the longitudinal axis L. Two dosing indicia 60 can make it simpler and faster for users of the measuring cup 10 to find a dosing indicium 60 to reference as they pour the contents of the container 75 into the measuring cup 10.

Figure 8:
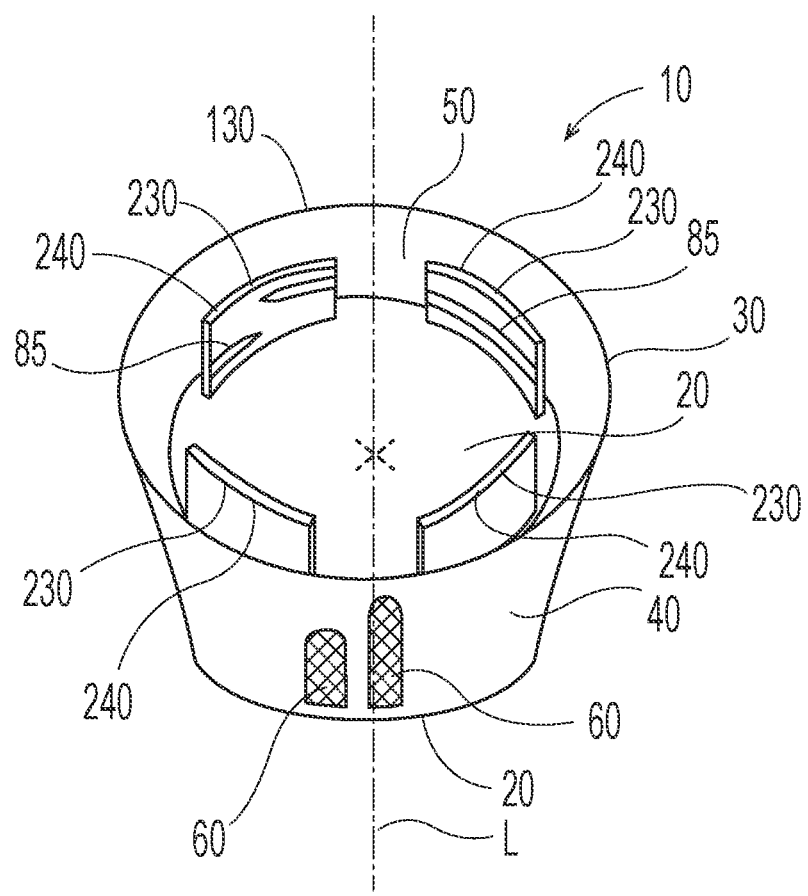
FIG. 8 is a measuring cup.

The measuring cup 10 can further comprise an inner collar 230 projecting from said bottom end 20 such that said inner collar 230 is between said sidewall 40 and said longitudinal axis L (FIG. 8). The inner collar 230 can extend around the longitudinal axis L continuously or partially. The inner collar 230 can comprise threads 85 or lugs oriented towards the longitudinal axis L. The inner collar 230 can comprise threads 85 or lugs oriented away from the longitudinal axis L. The threads 85 or lugs can mechanically engage with a corresponding threads or lugs on the neck of the container 75. The inner collar 230 can extend from the bottom end 20 to the collar rim 240.

Figure 9:
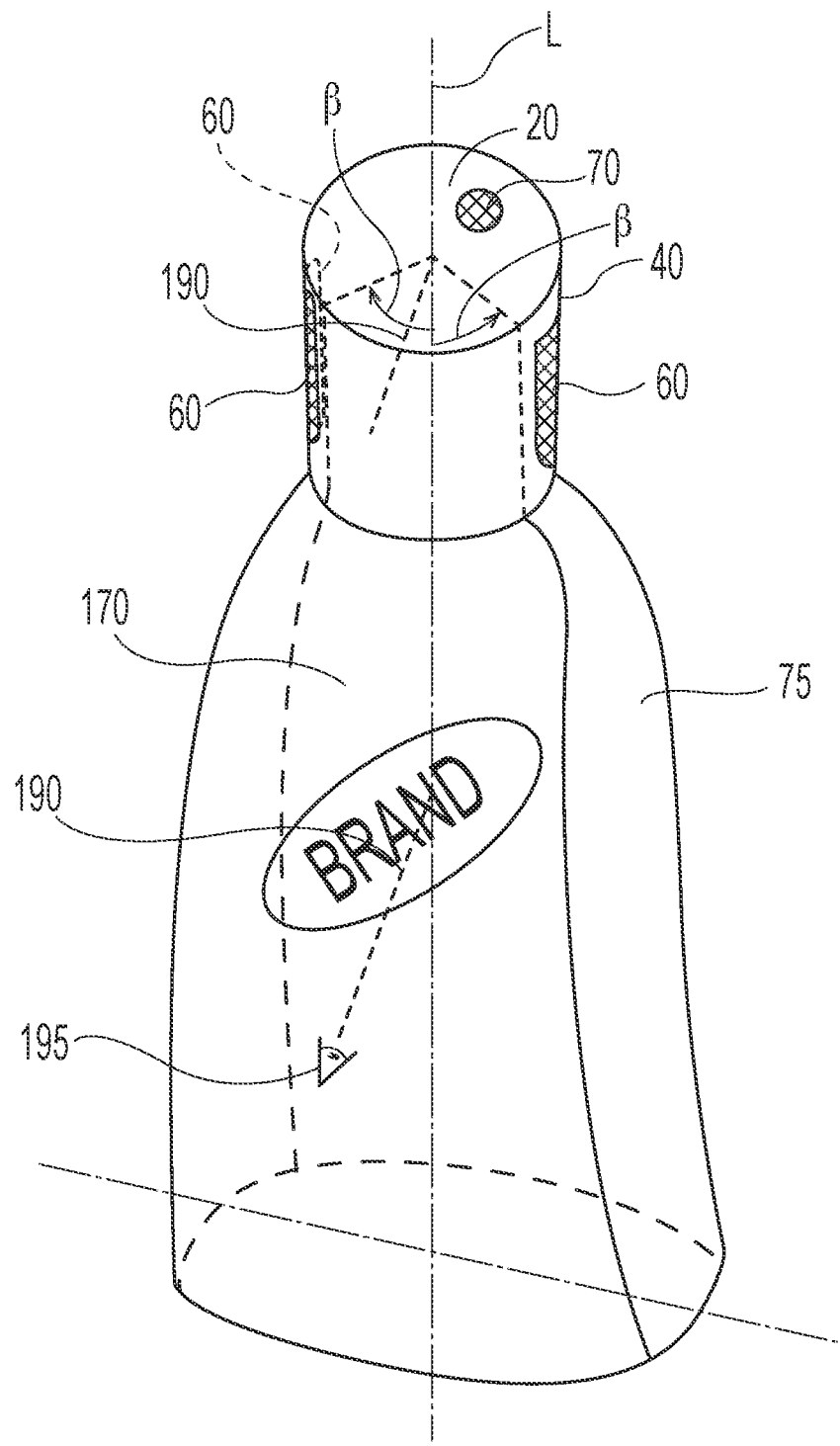
FIG. 9 is measuring cup engaged with a container.

The measuring cup 10 can be engaged with a container 75 having a primary label face 170, as shown in FIG. 9. The primary label face 170 of the container 75 is the face of the container 75 intended to be displayed in a retail environment to a person who is contemplating purchasing the container 75. The retail environment can be a real environment, such as a brick and mortar store in which the container 75 and measuring cup 10 are present or a virtual environment in which the container 75 and measuring cup 10 are displayed on a screen. The primary label face 170 of the container 75 can contain the brand name of the product contained within the container 75 in a large enough font so as to be readable by an observer at a distance of between about 0.1 m and about 2 m under typical lighting conditions that occur in a typical brick and mortar retail environment. The primary label face 170 of the container 75 can be generally in line with a local major axis 180 of the container 75, recognizing that the primary label face 170 may be a curved surface. The major axis 180 is the axis of the container 75 horizontally perpendicular to the direction in which the container 75 is intended to be viewed in a retail environment. The major axis 180 can be orthogonal to the longitudinal axis L. The major axis 180 can be orthogonal to the longitudinal axis L and pass through the longest dimension of the container 75 orthogonal to the longitudinal axis L.

The dosing indicium 60 can be out of alignment from the primary label face 170 by an angle β more than about 45 degrees about the longitudinal axis L. That is, the angle β sweeps orthogonal to the longitudinal axis L. The visual appearance of a dosing indicium 60 marked on the exterior surface 90 when viewed from outside the measuring cup 10 may not be satisfactory. The dosing indicium 60 on the exterior surface 90 being perceived by the user viewing the exterior surface 90 may be distracting. As such, it can be desirable to position the dosing indicium 60 such that it is not presented in line with the site line 190 of the viewer 195 of the primary label face 170.

The sidewall 40 can comprise two dosing indicia 60. Both of the dosing indicia 60 can be out of alignment from the primary label face 170 by an angle β more than about 45 degrees about the longitudinal axis L. Arranged as such, both dosing indicia 60 can be oriented more to the sides of the container 75 as opposed to being aligned with the primary label face 170. That can reduce the visibility of the dosing indicia 60 when the primary label face 170 is viewed.

Optionally, the bottom end 20 can comprise a bitmapped pattern 70 of chemically or structurally modified bits 80 of the bottom end 20. The bitmapped pattern 70 on the bottom end 20 can comprise at least two rows R of bits 80. The bitmapped pattern 70 on the bottom end 20 can define usage instructions, dosing instructions, branding, date coding, and the like. The bitmapped pattern 70 on the bottom end 20 can direct the user to employ the bitmapped pattern 70 of the sidewall 40 constituting the dosing indicium 60.

Figure 10:
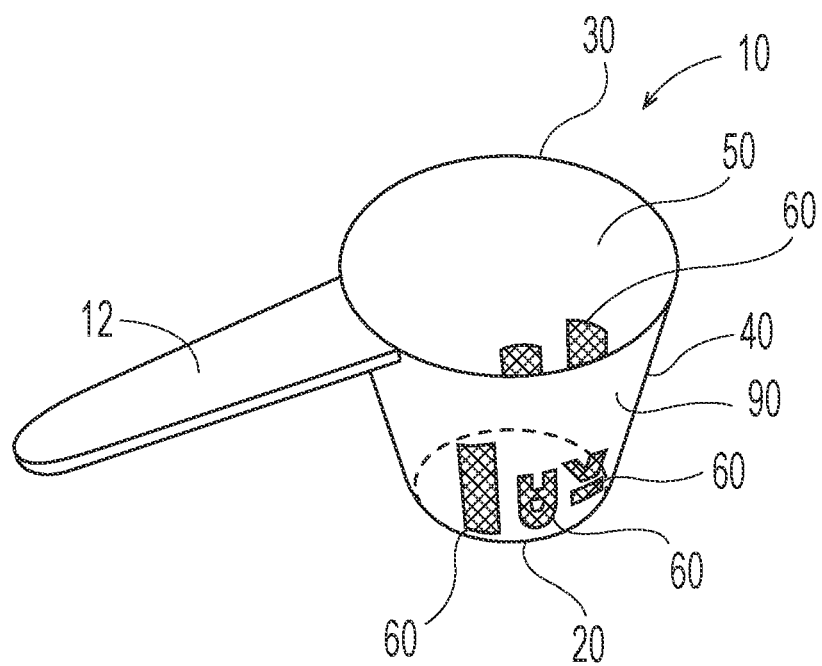
FIG. 10 is a measuring cup having a handle.

The measuring cup 10 can comprise a handle 12 extending from one or both of the open end 30 and sidewall 40 (FIG. 10). The handle 12 can be sized and dimensioned to be grasped by an adult human hand. The handle 12 can be sized and dimensioned to be pinched between an adult's thumb and the side of their index finger. The handle 12 can have a handle length from about 10 mm to about 150 mm. The handle 12 can include a bitmapped pattern 70 that comprises at least two rows R of bits 80, the bitmapped pattern 70 being instructions for using the measuring cup 10.

The material constituting the measuring cup 10 can be colored. The color of the unmarked material can be yellow (L*=88.815, a*=13.05, b*=88.178), dark blue (L*=45.587, a*=11.407, b*=−57.519), dark purple (L*=40.877, a*=52.184, b*=−36.827), light blue (L*=75.039, a*=−19.931, b*=−32.492), light purple (L*=61.052, a*=23.611, b*=−40.46), dark blue (L*=31.622, a*=24.242, b*=−60.097), or green (L*=77.91, a*=−43.147, b*=57.65). For each of the aforesaid colors, the coordinates L*, a*, and b* for the color can be the coordinate reported plus or minus 10% of the coordinate reported.

The material constituting the measuring cup 10 can be colored. The color of the unmarked material constituting the measuring cup 10 can be as set forth in Table 1. Each of the coordinates L*, a*, and b* for the color of each example could be the coordinate reported plus or minus 10% of the coordinate reported.

TABLE 1

Example measured average colors of unmarked material constituting the measuring cup using a scanner as described herein.

| Example | Color Description | Scanner Backing Color | L* | a* | b* |
|---|---|---|---|---|---|
| 1a | Teal | White | 58.4 | −30.3 | −14.5 |
| 2a | Green | White | 56.0 | −56.3 | 43.6 |
| 3a | Pink | White | 41.2 | 56.6 | 4.8 |
| 4a | Blue | White | 10.6 | 0.6 | −16.4 |
| 5a | Purple | White | 31.4 | 33.9 | −34.5 |
| 6a | Turquoise | White | 75.7 | −26.7 | −10.3 |
| 7a | Pink | White | 65.6 | 56.3 | 14.4 |
| 8a | Blue | White | 30.3 | 5.2 | −38.9 |
| 1b | Teal | Black | 54.6 | −27.1 | −16.2 |
| 2b | Green | Black | 54.2 | −54.9 | 43.1 |
| 3b | Pink | Black | 39.3 | 52.6 | 2.6 |
| 4b | Blue | Black | 9.9 | 0.8 | −16.4 |
| 5b | Purple | Black | 30.4 | 32.2 | −34.6 |
| 6b | Turquoise | Black | 72.7 | −23.6 | −10.9 |
| 7b | Pink | Black | 65.5 | 56.1 | 15.3 |
| 8b | Blue | Black | 29.6 | 5.0 | −38.2 |

Plaques of polypropylene 0.97 mm thick having the colors in Table 1 were marked. The plaques were marked as described in Table 2.

TABLE 2

Laser settings for marking plaques having the colors of Table 1.

| Example | Pulse Duration (ns) | Pulse Energy μJ | Pulse Spacing mm | Fill Spacing mm |
|---|---|---|---|---|
| 1a | 16 | 144 | 0.05 | 0.055 |
| 2a | 16 | 144 | 0.06 | 0.055 |
| 3a | 16 | 144 | 0.045 | 0.055 |
| 4a | 30 | 240 | 0.045 | 0.045 |
| 5a | 30 | 240 | 0.045 | 0.05 |
| 6a | 16 | 144 | 0.045 | 0.05 |
| 7a | 16 | 144 | 0.045 | 0.055 |
| 8a | 30 | 240 | 0.055 | 0.055 |
| 1b | 16 | 144 | 0.05 | 0.055 |
| 2b | 16 | 144 | 0.06 | 0.055 |
| 3b | 16 | 144 | 0.045 | 0.055 |
| 4b | 30 | 240 | 0.045 | 0.045 |
| 5b | 30 | 240 | 0.045 | 0.05 |
| 6b | 16 | 144 | 0.045 | 0.05 |
| 7b | 16 | 144 | 0.045 | 0.055 |
| 8b | 30 | 240 | 0.055 | 0.055 |

The plaques having the colors of Table 1 were laser marked. The average CIELAB colors of the marked locations of the material as measured on the sides of the material that were marked were as set forth in Table 3. Table 3 also includes the $|\Delta L^*_{outside}|$ between marked and unmarked locations. The term $|\Delta L^*_{outside}|$ is used since this side could constitute the exterior surface 90 of a measuring cup 10. These differences are indicative of how distinctly the marked location stands out from the unmarked material when the material is viewed from the side of the plaque that is marked.

TABLE 3

Average colors of the marked location of material constituting the plaques, $|\Delta L^*_{outside}|$ being indicative of how visible a marked location is when viewed from the side of the plaque that is marked.

| Example | Color Description | Scanner Backing Color | L* | a* | b* | $|\Delta L^*_{outside}|$ Compares the intensity difference between similar sized ROIs |
|---|---|---|---|---|---|---|
| 1a | Teal | White | 33.9 | −20.6 | −6.5 | 24.5277 |
| 2a | Green | White | 35.9 | −33.6 | 22.8 | 20.0919 |
| 3a | Pink | White | 29.6 | 13.8 | 1.5 | 11.5933 |
| 4a | Blue | White | 62.3 | −1.5 | 2.6 | 51.7619 |
| 5a | Purple | White | 46.5 | 2.7 | 1.5 | 15.1107 |
| 6a | Turquoise | White | 47.9 | −16.3 | −0.3 | 27.807 |
| 7a | Pink | White | 40.1 | 23.9 | 6.2 | 25.4495 |
| 8a | Blue | White | 51.7 | −11.5 | 0.0 | 21.4565 |
| 1b | Teal | Black | 31.8 | −18.0 | −7.4 | 22.7552 |
| 2b | Green | Black | 35.1 | −32.6 | 22.3 | 19.1364 |
| 3b | Pink | Black | 28.9 | 11.9 | 1.1 | 10.3738 |
| 4b | Blue | Black | 62.0 | −1.5 | 2.5 | 52.0716 |
| 5b | Purple | Black | 46.2 | 2.6 | 1.5 | 15.7308 |
| 6b | Turquoise | Black | 46.1 | −14.0 | −1.0 | 26.6769 |
| 7b | Pink | Black | 39.4 | 22.1 | 5.4 | 26.1168 |
| 8b | Blue | Black | 51.3 | −11.5 | 0.0 | 21.6979 |

95% Delta Color Value Measurement Method

To measure the 95% Delta Color Value Measurement of a visual effect disposed on an article, a sample must be identified that includes the visual effect to be analyzed. This is done by visually locating the visual effect to be analyzed. If available, an area of low curvature or an area which can be made suitably flat using pressure or a frame on the article is selected to sample. The sample is prepared by cutting a rectangular piece from the article in such a fashion that the sample is nearly flat. To obtain the sample, sharp scissors (or other cutting means that will not destroy the sample piece itself) are used to first cut a piece from the article wall A sharp single edge, GEM polytetrafluoroethylene (PTFE) coated stainless steel razor blade such as available from Electron Microscopy Sciences, 1560 Industry Road, Hatfield, PA 19440 (item #71970), or the like, is used to carefully trim the sample down to the desired dimensions. The center of the sample must include both marked and unmarked regions. The sample will be scanned and a circular region of interest (C-ROI) will be analyzed from the center of the sample. The C-ROI should contain at least 50,000 pixels. Pixel count can be calculated from the equation below:

$$NumberPixels = \pi \left( \frac{CircleDiameter}{2} * ScannerResolution \right)^2$$

At least 10% of the circular area of the sample must be made up of a marked region and at least 10% of the circular area of the sample must be made up of non-marked region. The sample can be any suitable size so long as it is larger than a circle positioned at the sample's center with the required diameter. The C-ROI should be free of any cutting-edge artifacts and visible dirt.

Since the visual perception of semi-transparent samples can be affected by the background color, it is best practice to evaluate the samples over a white and a black background. The sample is separately scanned while having a white backing and then a black backing where, for example, the backings can consist of the white and black halves of the 2856 Byko-chart Brushout 5DX card available from BYK-Gardner, Germany, or an equivalent having a spatially consistent appearance of L*>91, −5<a*<5, and −3<b*<3 for the white backing and spatially consistent appearance of L*<8, −2<a*<2, and −2<b*<2 for the black backing The backing is placed on the opposite surface of the article from which the scan image will be collected. The sample is conditioned at about 23° C.±2 C.° and about 50%±2% relative humidity for 2 hours prior to analysis.

A flatbed scanner capable of scanning a minimum of 24 bit color at 1200 dpi optical resolution (maximum scan resolution of the CCD elements, using the definition of ISO 14473) with manual control of color management (a suitable scanner is an Epson PERFECTION V750/V850 Pro from Epson America Inc., Long Beach CA, or equivalent) is obtained and calibrated, as set forth herein. The scanner is interfaced with a computer running color calibration software capable of calibrating the scanner against a color reflection IT8 target compliant with ISO 12641 such as SilverFast from LaserSoft Imaging AG, Kiel, Germany utilizing a corresponding reference file compliant with ANSI method IT8.7/2-1993 (suitable color calibration software is MONACO EZCOLOR or IISTUDIO available from X-Rite Grand Rapids, MI, or equivalent). The color calibration software constructs an International Color Consortium (ICC) color profile for the scanner, which is used to color correct an output image using an image analysis program that supports application of ICC profiles (a suitable program is PHOTOSHOP available from Adobe Systems Inc., San Jose, CA, or equivalent). The color corrected image is then converted into the CIE L*a*b* color space for subsequent color analysis (a suitable image color analysis software is MATLAB version 9.12 available from The Mathworks, Inc., Natick, MA).

The scanner is turned on 30 minutes prior to calibration and image acquisition. Any automatic color correction or color management options included in the scanner software are turned off (de-selected). If the automatic color management cannot be disabled, the scanner is not appropriate for this application. The procedures recommended by the color calibration software are followed to create and export an ICC color profile for the scanner. The scanning surface should be free of dirt, dust, streaks, and any other image distorting elements.

Two scans of the sample will be made for the analysis. One scan is performed for each side of the sample. A scan is taken that completely contains the sample and is imported into the image analysis software at 24 bit color with a resolution of at least 1200 dpi (approximately 47.2 pixels per mm) in reflectance mode. The ICC color profile is assigned to the image producing a color corrected sRGB image. This calibrated image is saved in an uncompressed format to retain the calibrated R, G, B color values, such as a TIFF file, prior to analysis.

The sRGB color calibrated image is opened in the color analysis software such as MATLAB which converts it into CIE L*a*b* color space. This is done as follows: First, the sRGB data is scaled into a range of [0, 1] by dividing each of the values by 255. Second, the sRGB channels (denoted with upper case R, G, B), or generically "V" are linearized (denoted with lower case r, g, b), or generically "v" as the following operation is performed on all three channels (R, G, and B):

$$V \in \{R, G, B\}$$
$$v \in \{r, g, b\}$$
$$v = \begin{cases} \dfrac{V}{12.92} & \text{if } V \leq 0.04045 \\ \left(\dfrac{V + 0.055}{1.055}\right)^{2.4} & \text{otherwise} \end{cases}$$

The linear r, g, and b values are then multiplied by a matrix to obtain the XYZ Tristimulus values according to the following formula:

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} r \\ g \\ b \end{bmatrix}$$

The XYZ Tristimulus values are rescaled by multiplying the values by 100, and then converted into CIE 1976 L*a*b* values as defined in CIE 15:2004 section 8.2.1.1 using D65 reference white.

The CIE L*a*b* images are analyzed by outlining the sample in each image. This can be done manually or using automated thresholding assuming there is sufficient contrast between the sample and backing described earlier. The outline of the sample is used to create a binary image where inside the outline is the foreground and outside the outline is the background. From the binary image, the centroid of the sample also known as the geometric center of the shape can be found using standard image processing methods such as the "regionprops" function in MATLAB. The center of the shape is used as the center of the C-ROI. The C-ROI should overlay nearly the same area of the sample on both the marked sided and the unmarked side of the article.

The L*, a*, and b* values for each pixel within the C-ROI are compared with the L*, a*, and b* values for every other pixel in the C-ROI. An absolute value ΔL* and ΔE are computed for each comparison. They are derived using the following equations:

$$\Delta E_{i,j} = \sqrt{(L_i^* - L_j^*)^2 + (a_i^* - a_j^*)^2 + (b_i^* - b_j^*)^2}$$

$$\Delta L_{i,j}^* = |L_i^* - L_j^*|$$

For each pixel 'i', ΔL* and ΔE is calculated for every pixel 'j' not equal to 'i'.

A cumulative histogram of these ΔL* and ΔE values are divided by the total number of ΔL* and ΔE measurements. Therefore, the last bin value will be 1, which represents 100% of the Delta measurements. The bin size of the cumulative histogram is set equal to 0.1. The largest bin value less than 95% is recorded as the "95% Bin Value" for the sample to ignore any remaining noise in the image.

Results are reported for each sample scanned using the white backing as well as the black backing.

Combinations:

An Example follows:

A. A measuring cup (10) comprising:
   a bottom end (20) and an open end (30) opposite said bottom end;
   a light pervious sidewall (40) extending from said bottom end to said open end, wherein said sidewall has an exterior surface (90) oriented away from a longitudinal axis (L) about which said sidewall extends; and a dosing indicium (60) integral with said exterior surface, wherein at least a portion of said dosing indicium comprises a bitmapped pattern (70) of chemically or structurally modified bits (80) of said side wall, wherein said bitmapped pattern comprises at least two rows (R) of said bits.

B. The measuring cup according to Paragraph A, wherein said bits are spaced apart from one another in a regular pattern within and amongst said rows or wherein said bits amongst said rows are in registration with one another.

C. The measuring cup according to Paragraph A or B, wherein said measuring cup is removably engaged with a container (75).

D. The measuring cup according to any of Paragraphs A to C, wherein said measuring cup is a closure (100) for a container (75).

E. The measuring cup according to any of Paragraphs A to D, wherein said bottom end comprises an aperture (110).

F. The measuring cup according to any of Paragraphs A to E, wherein said bottom end defines a resting plane (120) for said measuring cup and said open end is defined by a peripheral rim (130), wherein said side wall has a sidewall height (140) between said resting plane and said peripheral rim, wherein said sidewall height is measured orthogonal to said resting plane, wherein said dosing indicium has a dosing indicium height (150) measured over a maximum extent of said dosing indicium orthogonal to said resting plane, wherein said dosing indicium height is from about 20% to about 100% of said sidewall height measured at said dosing indicium.

G. The measuring cup according to any of Paragraphs A to F, wherein said bottom end defines a resting plane (120) for said measuring cup, wherein said sidewall extends around a longitudinal axis (L) wherein said dosing indicium comprises a continuous or discontinuous marked portion (160) having a boundary (162) parallel to said resting plane and traversing more than about 5 degrees of said sidewall about said longitudinal axis, wherein said sidewall is unmarked along said boundary.

H. The measuring cup according to any of Paragraphs A to G, wherein said bottom end defines a resting plane (120) for said measuring cup, wherein said sidewall extends around a longitudinal axis (L), wherein said dosing indicium comprises a line or dashed line (163) parallel to said resting plane and traversing more than about 5 degrees of said sidewall about said longitudinal axis.

I. The measuring cup according to any of Paragraphs A to H, wherein said measuring cup comprises at least two said dosing indicia, wherein one said dosing indicium is positioned to indicate a first quantity of flowable material and another said dosing indicium is positioned to indicate a second quantity of flowable material that differs from said first quantity of flowable material.

J. The measuring cup according to any of Paragraphs A to I, wherein said bottom end is flat.

K. The measuring cup according to any of Paragraphs A to J, wherein said dosing indicium is a continuous region (172).

L. The measuring cup according to any of Paragraphs A to K, wherein said bits comprise gas bubbles or wherein said bits comprise more gas bubbles per unit area than said sidewall adjacent said dosing indicium.

M. The measuring cup according to any of Paragraphs A to L, wherein said bits have a higher carbon content than said sidewall adjacent said dosing indicium.

N. The measuring cup according to any of Paragraphs A to M, wherein said sidewall comprises a laser absorption additive.

O. The measuring cup according to any of Paragraphs A to N, wherein said sidewall comprises absorption additive and said absorption additive within said bits has a different oxidative state than said absorption additive in said sidewall adjacent said dosing indicium.

P. The measuring cup according to any of Paragraphs A to O, wherein said bits are ablated relative to said sidewall adjacent said dosing indicium.

Q. The measuring cup according to any of Paragraphs A to P, wherein said bits are etched relative to said sidewall adjacent said dosing indicium.

R. The measuring cup according to any of Paragraphs A to Q, wherein said sidewall is light pervious.

S. The measuring cup according to any of Paragraphs A to R, wherein said exterior surface has a 95% Bin Value Absolute $\Delta L^*$ greater than about 1, optionally greater than about 3, optionally greater than about 5, optionally greater than about 10, according to the 95% Delta Color Value Measurement Method using either a white backing or a black backing.

T. The measuring cup according to any of Paragraphs A to S, wherein said sidewall has a sidewall height (140) between said base interior and said open end measured orthogonal to said resting plane, wherein at least part of said dosing indicium is located at a position measured from said resting plane that is less than 25% of said sidewall height.

U. The measuring cup according to any of Paragraphs A to T, wherein said dosing indicium is a continuous region (172) present on more than about 0.5% of said exterior surface.

V. The measuring cup according to any of Paragraphs A to U, wherein said bits are arranged in rows (R) and bits constituting said rows are center to center spaced apart from one another by a first spacing (S1) and said rows are spaced apart from one another by a second spacing (S2), wherein said second spacing is greater than said first spacing.

W. The measuring cup according to any of Paragraphs A to V, wherein said exterior surface has a 95% Bin Value $\Delta E$ greater than about 1, optionally greater than about 3, optionally greater than about 5, optionally greater than about 10, according to the 95% Delta Color Value Measurement Method using either a white backing or a black backing.

X. The measuring cup according to any of Paragraphs A to W, wherein said sidewall extends around a longitudinal axis (L), where said measuring cup comprises two said dosing indicia at radially opposite positions about said longitudinal axis.

Y. The measuring cup according to any of Paragraphs A to X, wherein said sidewall extends around a longitudinal axis (L), wherein said measuring cup is engaged with a container (75), wherein said container has a primary label face (170), and wherein said dosing indicium is out of alignment from said primary label face by more than about 45 degrees about said longitudinal axis.

Z. The measuring cup according to any of Paragraphs A to Y, wherein said container has a primary label face (170), wherein said sidewall extends around a longitudinal axis (L), wherein said measuring cup is in engaged with a container (75), wherein said sidewall comprises two said dosing indicia, and wherein both said dosing indicia are out of alignment from said primary label face by more than about 45 degrees about said longitudinal axis.

AA. The measuring cup according to any of Paragraphs A to Z, wherein said exterior surface is curved coincident with at least a portion of said dosing indicium.

BB. The measuring cup according to any of Paragraphs A to AA, wherein said sidewall extends around a longitudinal axis (L), wherein said sidewall comprises threads (85) nearer to said open end than to said bottom end, wherein said sidewall at a location coincident with said dosing indicium is blow molded and extends further away from said longitudinal axis than said threads.

CC. The measuring cup according to any of Paragraphs A to BB, wherein said measuring cup further comprises a handle (12) extending from one or both of said open end and side sidewall.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. U.S. patent application Ser. Nos. 17/963,214, 17/963,215, 17/987,893, and 17/987,895 are hereby incorporated by reference in their entirety. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A measuring cup comprising:
   a bottom end and an open end opposite said bottom end;
   a light pervious sidewall extending from said bottom end to said open end, wherein said sidewall has an exterior surface oriented away from a longitudinal axis about which said sidewall extends; and
   a dosing indicium integral with said exterior surface, wherein at least a portion of said dosing indicium comprises a bitmapped pattern of chemically or structurally modified bits of said side wall, wherein said bitmapped pattern comprises at least two rows of said bits, and wherein said bits are spaced apart from one another in a regular pattern within and amongst said rows or wherein said bits amongst said rows are in registration with one another.

2. The measuring cup according to claim 1, wherein said measuring cup is removably engaged with a container.

3. The measuring cup according to claim 1, wherein said bottom end comprises an aperture.

4. The measuring cup according to claim 1, wherein said bottom end defines a resting plane for said measuring cup and said open end is defined by a peripheral rim, wherein said side wall has a sidewall height between said resting plane and said peripheral rim, wherein said sidewall height is measured orthogonal to said resting plane, wherein said dosing indicium has a dosing indicium height measured over a maximum extent of said dosing indicium orthogonal to said resting plane, wherein said dosing indicium height is from about 20% to about 100% of said sidewall height measured at said dosing indicium.

5. The measuring cup according to claim 1, wherein said bottom end defines a resting plane for said measuring cup, wherein said sidewall extends around a longitudinal axis wherein said dosing indicium comprises a continuous or discontinuous marked portion having a boundary parallel to said resting plane and traversing more than about 5 degrees of said sidewall about said longitudinal axis, wherein said sidewall is unmarked along said boundary.

6. The measuring cup according to claim 1, wherein said measuring cup comprises at least two said dosing indicia, wherein one said dosing indicium is positioned to indicate a first quantity of flowable material and another said dosing indicium is positioned to indicate a second quantity of flowable material that differs from said first quantity of flowable material.

7. The measuring cup according to claim 1, wherein said bottom end is flat.

8. The measuring cup according to claim 1, wherein said dosing indicium is a continuous region.

9. The measuring cup according to claim 1, wherein said bits comprise gas bubbles or wherein said bits comprise more gas bubbles per unit area than said sidewall adjacent said dosing indicium.

10. The measuring cup according to claim 1, wherein said bits have a higher carbon content than said sidewall adjacent said dosing indicium.

11. The measuring cup according to claim 1, wherein said sidewall comprises absorption additive.

12. The measuring cup according to claim 1, wherein said sidewall comprises absorption additive and said absorption additive within said bits has a different oxidative state than said absorption additive in said sidewall adjacent said dosing indicium.

13. The measuring cup according to claim 1, wherein said bits are ablated relative to said sidewall adjacent said dosing indicium.

14. The measuring cup according to claim 1, wherein said bits are etched relative to said sidewall adjacent said dosing indicium.

15. The measuring cup according to claim 1, wherein said sidewall is light pervious.

16. The measuring cup according to claim 1, wherein said exterior surface has a 95% Bin Value Absolute $\Delta L^*$ greater than about 3 according to the 95% Delta Color Value Measurement Method using either a white backing or a black backing.

17. The measuring cup according to claim 1, wherein said sidewall has a sidewall height between said base interior and said open end measured orthogonal to said resting plane, wherein at least part of said dosing indicium is located at a position measured from said resting plane that is less than 25% of said sidewall height.

18. The measuring cup according to claim 1, wherein said bits are arranged in rows and bits constituting said rows are center to center spaced apart from one another by a first spacing and said rows are spaced apart from one another by a second spacing, wherein said second spacing is greater than said first spacing.

19. The measuring cup according to claim 1, wherein said exterior surface has a 95% Bin Value $\Delta E$ greater than about 3 according to the 95% Delta Color Value Measurement Method using either a white backing or a black backing.

20. The measuring cup according to claim 1, wherein said bitmapped pattern comprises at least three rows of said bits.

21. The measuring cup according to claim 1, wherein said dosing indicium is a continuous region of said bits.

22. A measuring cup comprising:
a bottom end and an open end opposite said bottom end;
a light pervious sidewall extending from said bottom end to said open end, wherein said sidewall has an exterior surface oriented away from a longitudinal axis about which said sidewall extends; and
a dosing indicium integral with said exterior surface, wherein at least a portion of said dosing indicium comprises a bitmapped pattern of chemically or structurally modified bits of said side wall, wherein said bitmapped pattern comprises at least three rows of said bits.

23. The measuring cup according to claim 22, wherein said bits are spaced apart from one another in a regular pattern within and amongst said rows.

24. The measuring cup according to claim 22, wherein said bits amongst said rows are in registration with one another.

25. The measuring cup according to claim 22, wherein said exterior surface has a 95% Bin Value Absolute $\Delta L^*$ greater than about 3 according to the 95% Delta Color Value Measurement Method using either a white backing or a black backing.

26. The measuring cup according to claim 22, wherein said exterior surface has a 95% Bin Value $\Delta E$ greater than about 3 according to the 95% Delta Color Value Measurement Method using either a white backing or a black backing.

* * * * *